Feb. 7, 1928.

J. H. HANLON ET AL 1,658,083

DRIFTING VALVE FOR LOCOMOTIVES

Filed Aug. 13, 1921

INVENTORS:
John H. Hanlon and
William J. Hanlon
by Macleod, Calvr, Copeland & Sykes
ATTYS Feb. 7, 1928.

J. H. HANLON ET AL 1,658,083

DRIFTING VALVE FOR LOCOMOTIVES

Filed Aug. 13, 1921    3 Sheets-Sheet 2

INVENTORS
John H. Hanlon and
William J. Hanlon
by Macleod, Calm Copeland Attys.

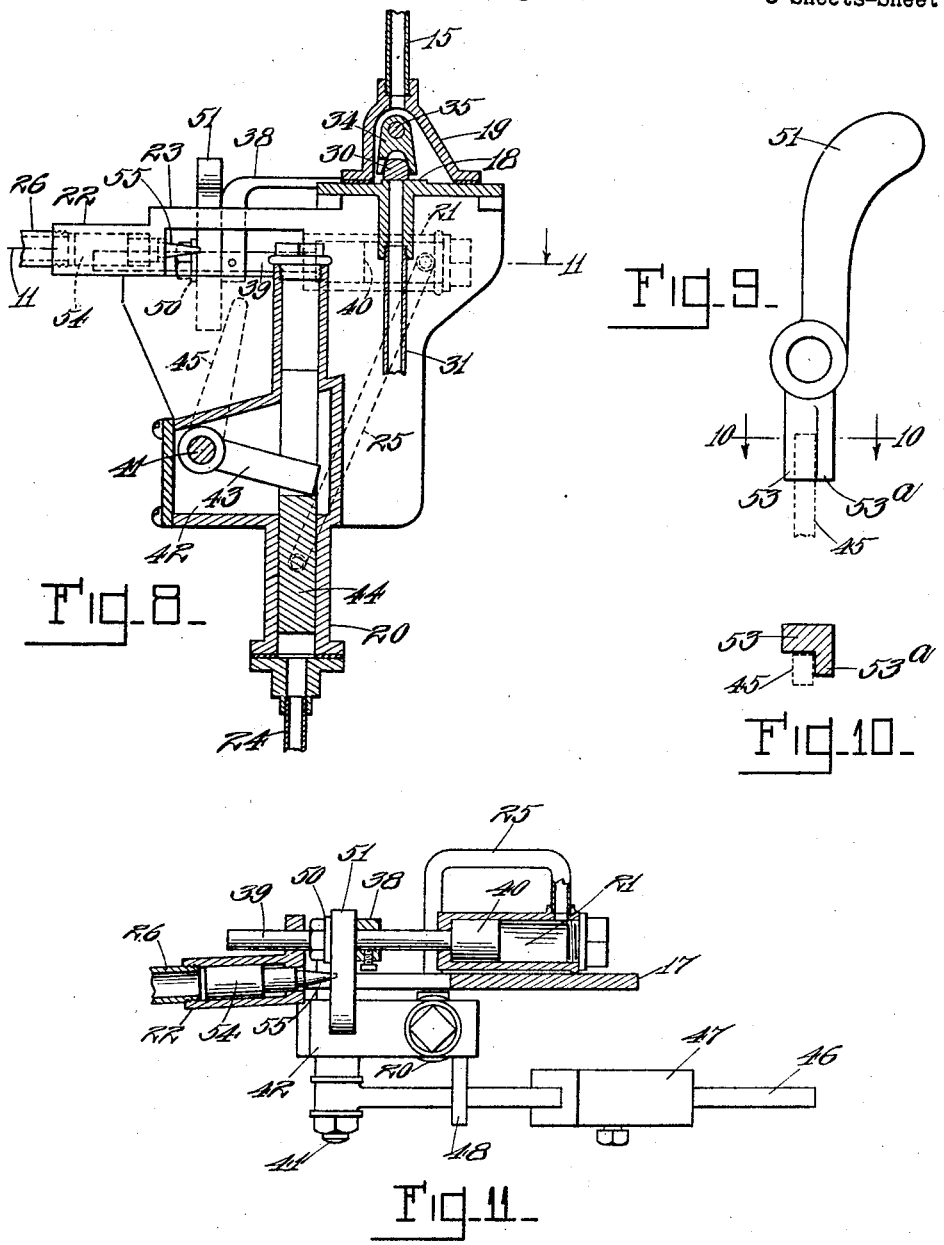

Patented Feb. 7, 1928.

1,658,083

UNITED STATES PATENT OFFICE.

JOHN H. HANLON, OF SOMERVILLE, AND WILLIAM J. HANLON, OF FITCHBURG, MASSACHUSETTS.

DRIFTING VALVE FOR LOCOMOTIVES.

Application filed August 13, 1921. Serial No. 491,913.

This invention relates to drifting valves for use on steam locomotives and by which wet or saturated steam is furnished to the working cylinders of the locomotive during the time when the latter is in motion but is not being supplied with steam through the dry pipe.

The invention has for its object to provide an improved drifting valve which is automatically controlled by the pressure conditions in the valve chest and exhaust passages of the engine to supply steam to the engine cylinders at the proper times and to cut off the supply when not required;
which operates to supply steam directly to the cylinders, as distinguished from the valve chest as in prior constructions, thereby permitting the device to act with equal efficiency irrespective of the cut-off positions into which the engine valves have been set, at the same time preventing leakage between the ends of the cylinders under normal working; which is not opened when the locomotive is operated under light loads, as in moving the same about the yard; and which is otherwise of such a character as effectually and reliably to prevent the admission of steam to the engine cylinders at improper times.
The foregoing and other objects of the invention, together with means whereby the same may be carried into effect, will best be understood from the following description of one form or embodiment thereof illustrated in the accompanying drawings, in which:—

Figure 4:
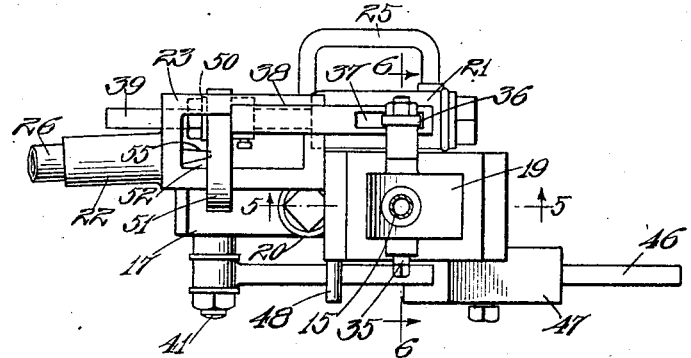
Fig. 4 is a plan view of the parts shown in Figures 2 and 3.
Figure 5:
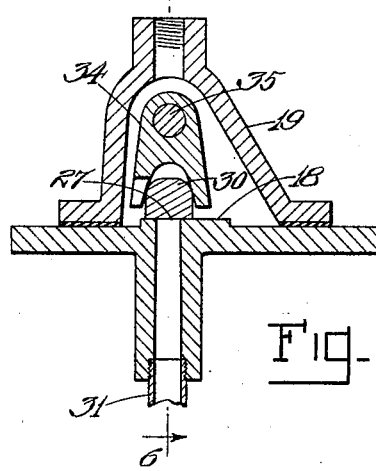
Figure 6:
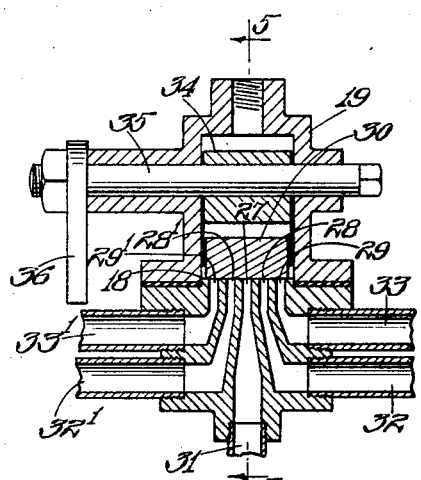

Figs. 5 and 6 are enlarged detail sections on the lines 5—5 and 6—6 respectively of Figure 4.

Figures 1, 2, 3:
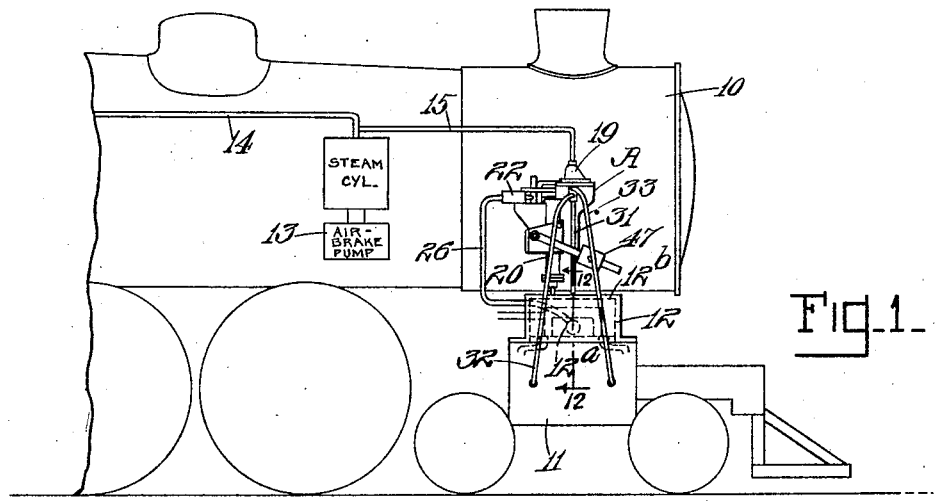
Fig. 1 is a somewhat diagrammatic side elevation of a portion of a locomotive having the invention applied thereto.
Fig. 2 is a side elevation of the drifting valve mechanism.
Fig. 3 is an end elevation thereof, looking from the left in Figure 2.
Figure 7:
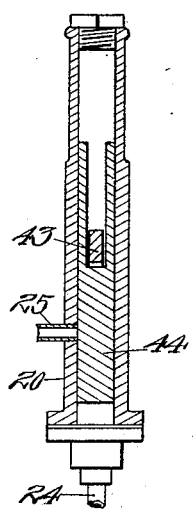

Fig. 7 is a section, taken substantially on the line 7—7 of Figure 2, of the cylinder portion of the body of the drifting valve mechanism.

Fig. 8 is a vertical section, taken on the same plane as Fig. 5, of substantially the complete apparatus.

Fig. 9 is an enlarged detail view of the dog for operatively connecting the drifting valve with its operating means.

Fig. 10 is a detail section on the line
10—10, Fig. 9.

Fig. 11 is a horizontal section on the line
11—11, Fig. 8.

Figure 12:
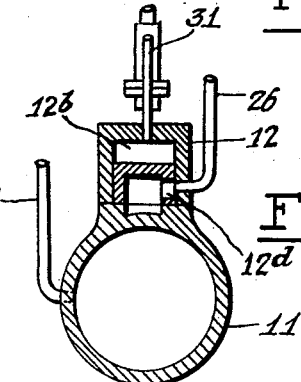

Fig. 12 is a section on the line 12—12,
Fig. 1.

Referring to Figure 1, there is shown therein a locomotive having a boiler 10, working cylinders 11 (of which one only is shown) provided with the usual valve chests 12 supplied with steam through the usual common dry pipe (not shown) under the control of the throttle. At 13 is diagrammatically illustrated the usual air brake pump supplied with saturated steam by a pipe 14 having a branch 15 leading to the drifting valve mechanism, designated as a whole in Figure 1 by the letter A. It will thus be seen that the drifting valve is supplied with steam from the same source as that which supplies the air brake pump. By this arrangement two important advantages are secured. In the first place, the oil supplied by the usual lubricator to the air brake pump is also fed to the drifting valve and thence to the engine cylinders; in the second place, the usual valve for controlling admission of steam to the air brake pump will also control the supply of steam to the drifting valve, so that the latter will not be operative unless the air brake system is working, which is highly desirable.

Referring now to Figures 2 to 7, the drifting valve mechanism comprises a main frame or body 17 having at its top a valve seat 18 (Figures 5 and 6) and to which is bolted or otherwise detachably secured a casing portion 19. The body portion or frame 17 is cored out to form a vertical cylinder 20 and a chamber 42, and has bolted or otherwise secured thereto a supplemental frame portion 23 formed at its ends with horizontal cylinder portions 21 and 22. The supply pipe 15 communicates with the top of the valve casing 19. The cylinder 20 communicates at its lower end, through a pipe 24, with the supply or pressure space 12$^b$ (Figs. 1 and 12) of the steam chest 12, and at a point above its lower end, through a pipe 25, with the outer end of the cylinder 21. The outer end of the cylinder 22 is in communication, through a pipe 26, with one of the exhaust passages or chambers of the engine, preferably with the exhaust space 12ª of the steam chest 12.

The valve seat 18 is formed with a series of ports, 27, 28, 28', 29 and 29', all of which are opened or closed simultaneously by a slide valve 30. The port 27 communicates, through a pipe 31, with the pressure space 12ᵇ of the valve chest 12. The ports 28 and 29 communicate, through pipes 32 and 33 respectively, with the opposite ends of one of the working cylinders 11. The ports 28' and 29' communicate similarly, through pipes 32' and 33', with the opposite ends of the working cylinder (not shown) at the other side of the locomotive. It will be seen that, when the valve 30 is moved to uncover the ports in the valve seat 18, steam supplied to the casing 19 through the pipe 15 will be admitted to both ends of the cylinders, while the interior of said casing 19 will also be in communication with the pressure space of the valve chest. Since it is customary in the usual operation of a locomotive to exhaust one end of one cylinder only at a time, it will be seen that only one of the ports in the seat 18 will at any time be open to the exhaust, and, as the area of each port is relatively small in proportion to the cross-sectional area of the pipe 15 and the combined area of all of the ports, the effect of such communication with the exhaust will be relatively small, so that a certain pressure will be maintained within the casing 19 at all times. When the valve 30 is in a position to cover the ports, as is the case in normal running, communication between the opposite ends of the several engine cylinders will be prevented.

The valve 30 is operated by means of an arm or fork 34 with which it is loosely engaged, said arm or fork being fast upon a shaft 35 journalled in suitable bearings in the casing 19. Outside the casing 19 the shaft 35 has fast thereon an arm 36 which is received in a slot 37 in a bent arm 38 fast on a piston rod 39 guided in the frame portion 23 and connected with a piston 40 in the cylinder 21.

Journalled in the frame or body 17 is a transverse shaft 41 having fast thereon within the chamber 42 an arm 43 (Figs. 2 and 8) which engages the slotted upper end of an elongated piston 44 in the cylinder 20. Fast upon the opposite ends of the shaft 41 are arms 45 and 46 respectively, the latter carrying an adjustable weight 47 and being limited in its upward and downward movements respectively by stops 48 and 49 projecting from the frame or body 17.

Loosely mounted on the piston rod 39, so as to rock thereon, but held against movement longitudinally of said rod between the hub of the arm 38 and a fast collar 50, is a dog 51 (shown in detail in Figs. 9 and 10) having a weighted upper end extending through an opening 52 in the frame portion 23 and tending normally to hold said dog in the angular position shown in full lines in Figure 3. The dog 51 has a lower end 53 which, when said dog is in the angular position shown in dotted lines in Figure 3, lies in the path of movement of the arm 45 on the shaft 41. The end 53 of the dog 51 is provided with a shoulder 53ª which, when the arm 45 is in engagement with said end, engages said arm laterally and holds said dog against movement from the dotted to the full line position of Figure 3. Within the cylinder 22 is a piston or plunger 54 (see particularly Fig. 11) having a tapered forward end 55 adapted, when the piston rod 39 is in the longitudinal position shown in Figures 2 and 4, to engage the dog 51 and rock the same on said piston rod from the position shown in full lines in Figure 3 into the position shown in dotted lines therein, the rocking movement of the dog in both directions being limited by engagement of said dog with the edges of the opening 52 in the frame portion 23. The axis of the cylinder 22, when viewed in plan, is disposed at a slight angle to the piston rod 39, as shown in Figs. 4 and 11, so that when said piston rod and dog 51 are moved toward the right, as hereinafter explained, the dog 51, when in the angular position shown in full lines in Figure 3, will lie in advance of the tapered end 55 of the plunger 54, and when said piston rod and dog are moved toward the left will return said plunger to the position shown in Figure 2, the relative angularity above referred to causing the said dog to move laterally out of engagement with the end of said plunger, so that when the parts assume the position shown in Figure 2 said plunger will be again in a position to rock said dog when moved forwardly.

In the drawings the parts are shown in their normal positions, or the positions which they assume when the throttle is closed and the locomotive at rest. At this time, the valve 30 is in a position to close the ports of the valve seat 18; the plunger 54, piston 40, piston rod 39, and dog 51 are in their longitudinal position farthest toward the left as shown in Figures 2 and 4; the dog 51 is in the angular position shown in full lines in Figure 3; and the arm 46 is held by the weight 47 in its lowermost position in engagement with the stop 49, the arm 43 consequently also holding the piston 44 depressed. When the throttle is opened to start the engine, pressure from the valve chest 12 is communicated through the pipe 24 to the lower end of the cylinder 20, thereby raising the piston 44, and consequently rocking the shaft 41 and the parts carried thereby into the position shown in dotted lines in Figure 2, this movement being limited by the stop 48. If at this time the locomotive be operating under a light load, as in moving to and from the roundhouse or about the yard, so that there is substantially no pressure in the exhaust passages of the engine, the dog 51 will remain in the position shown in full lines in Figure 3, with the lower end 53 thereof out of the path of movement of the arm 45 so that said arm may be oscillated without engaging said dog. When, however, a load is placed upon the locomotive, or when the locomotive is otherwise operating under high pressure, an exhaust pressure is built up in the exhaust passages of the engine, as will be familiar to those skilled in the art. This pressure is communicated through the pipe 26 to the cylinder 22, causing the plunger 54 to be moved forwardly or toward the right as shown in Figures 2 and 4, the tapered end 55 thereof rocking the dog 51 into the position shown in dotted lines in Figure 3 and bringing the lower end 53 thereof into the path of movement of the arm 45.

If, now, the throttle be closed to permit the engine to drift, the pressure in the valve chest 12, and consequently in the lower end of the cylinder 20, will fall, permitting the weight 47, acting through the arm 46, shaft 41, and arm 43, to depress the piston 44, and causing the arm 45 to move from the position shown in dot and dash lines at the left in Figure 2 into the position shown in dotted lines at the right therein. During this movement the engagement of said arm with the end 53 of the dog 51 will cause said dog, and consequently the piston rod 39 and arm 38 thereon, to be moved forwardly or toward the right in Figures 2 and 4. At this time the shoulder 53ª on the dog 51 will laterally engage the arm 45, as shown in Figs. 9 and 10, and will retain said dog in engagement with said arm and in the dotted line position of Figure 3 after it has moved out of engagement with the end 55 of the plunger 54. The movement of the arm 38 toward the right causes the said arm, by engagement with the arm 36, to rock the shaft 35 so as to cause the arm 34 to move the valve 30 into a position to uncover the ports in the valve seat 18, thereby admitting steam from the casing 19 to the opposite ends of the engine cylinders, as above explained.

When the throttle valve is again opened, or when, from any other cause, pressure is admitted to or has built up in the valve chest 12, said pressure is communicated through the pipe 24 to the cylinder 20, causing the piston 44 to rise and the shaft 41 and parts carried thereby to be returned to the position shown in dotted lines in Figure 2. This movement causes the arm 45 to disengage the shoulder 53ª on the dog 51 which thereupon returns by gravity to the angular position shown in full lines in Figure 3. As the piston 44 reaches or approaches the upper limit of its movement, it uncovers the port with which the adjacent end of the pipe 25 communicates, admitting pressure from the lower end of the cylinder 20 to said pipe and thence to the outer end of the cylinder 21. This pressure causes the piston 40 to move toward the left in Figure 2, carrying with it the piston rod 39 and arm 38, which, through the arm 36, shaft 35, and arm 34, again moves the valve 30 into the position to close the ports in the valve seat 18. During this movement the dog 51, by engagement with the end of the plunger 54, will return the latter to its normal position, as shown in Figure 2, thereby leaving the parts in a position to be again operated in the same manner upon a rise in pressure in the valve chest accompanied by the existence of pressure in the exhaust, as above explained.

Should the engine be brought to a stop after drifting, the valve 30 will remain temporarily in a position to uncover the ports in the valve seat 18, permitting steam to pass to the valve chest and cylinders. As soon, however, as this results in the building up of a pressure in the valve chest, such pressure is admitted through the pipe 24 to the cylinder 20, causing a movement of the piston 44 in the direction to close the valve 30, in the same manner as when the throttle valve is opened.

From the foregoing it will be seen that the improved valve herein described is adapted to operate automatically to admit saturated steam to the engine cylinders at the proper time and without attention on the part of the engineer whenever a condition of pressure in the exhaust passages of the engine is followed by a condition of low pressure in the valve chest. By virtue of this arrangement, the supply of saturated steam to the engine cylinders at the proper times is ensured, while on the other hand all danger of accidental admission of steam to said cylinders and consequent improper starting of the engine is avoided, since the mechanism will not operate except when a pressure has been built up in the exhaust passages of the engine, and this cannot occur when the engine is standing idle, or is being moved under a light pressure about the yard, but can only occur when the engine is operating under a relatively high pressure, as in normal running.

What I claim is:—

1. In a locomotive, the combination with a working cylinder, of a drifting valve, means controlled by the inlet pressure to said cylinder for operating said valve, and means controlled by the exhaust pressure from said cylinder for operatively connecting said valve and operating means.

2. In a locomotive having a working cylinder; a drifting valve, a rod for operating said valve, an arm controlled by the inlet pressure to said cylinder for operating said rod, and a dog controlled by the exhaust pressure from said cylinder for operatively connecting and disconnecting said arm and rod.

3. In a drifting valve mechanism, a valve, a rod for operating the same, an arm for operating said rod, and a dog carried by said rod and movable thereon into and out of the path of movement of said arm, said dog having a shoulder adapted to engage said arm to hold said dog against movement out of the path of movement of said arm when engaged thereby.

4. In a drifting valve mechanism, a valve, a rod for operating the same, an arm for operating said rod, a dog carried by said rod and angularly movable thereon into and out of the path of movement of said arm, and a pressure controlled plunger having a tapered end adapted to engage said dog and move the same on said rod.

5. In a drifting valve mechanism, a valve, a rod for operating the same, an arm for operating said rod, a dog carried by said rod and angularly movable thereon into and out of the path of movement of said arm, and a pressure controlled plunger having a tapered end adapted to engage said dog and move the same on said rod, the path of movement of said plunger being inclined to the direction of movement of said rod.

6. In a locomotive having a working cylinder; a drifting valve, gravity-operated means controlled by the inlet pressure to said cylinder for operating said valve, and means controlled by the exhaust pressure from said cylinder for operatively connecting said valve and operating means.

7. In a locomotive having a working cylinder; a drifting valve for supplying steam to said cylinder, means for opening said valve, means controlled by the inlet pressure to said cylinder for controlling said opening means, means controlled by the exhaust pressure from said cylinder for operatively connecting said valve and opening means, and means operated by said inlet pressure and controlled by said inlet pressure controlled means for closing said valve.

8. In a drifting valve mechanism, a valve, a cylinder, a piston in said cylinder having a piston rod operatively connected with said valve, a shaft, an arm on said shaft, a dog carried by said piston rod and angularly movable thereon into and out of the path of movement of said arm, a pressure controlled plunger having a tapered end adapted to engage said dog and move the same on said rod, a weighted arm on said shaft for turning the same, a third arm on said shaft, a second cylinder, means for supplying pressure to said second cylinder, a conduit leading from said second cylinder to said first-named cylinder, and a piston in said second cylinder controlling communication of said conduit therewith, said last-named piston cooperating with said third arm to control the movement of said shaft under the influence of said weighted arm.

In testimony whereof we affix our signatures.

JOHN H. HANLON.
WILLIAM J. HANLON.